(12) United States Patent
Hinkel

(10) Patent No.: US 6,533,088 B2
(45) Date of Patent: Mar. 18, 2003

(54) HYDRODYNAMIC CLUTCH DEVICE

(75) Inventor: Rüdiger Hinkel, Röthlein (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/864,444

(22) Filed: May 24, 2001

(65) Prior Publication Data

US 2001/0050204 A1 Dec. 13, 2001

(30) Foreign Application Priority Data

Jun. 7, 2000 (DE) ........................... 100 35 264

(51) Int. Cl.[7] .............................................. F16H 45/02
(52) U.S. Cl. ..................... 192/3.29; 192/212; 60/330
(58) Field of Search .............................. 192/3.28, 3.29, 192/212; 60/330, 338

(56) References Cited

U.S. PATENT DOCUMENTS 5,904,231 A * 5/1999 Arhab et al. ............... 192/3.29
5,996,750 A * 12/1999 Roshangar ................. 192/3.29
6,223,872 B1 * 5/2001 Heller et al. ............... 192/3.29

FOREIGN PATENT DOCUMENTS

DE 198 38 445 4/1999

* cited by examiner

Primary Examiner—Richard M. Lorence
(74) Attorney, Agent, or Firm—Cohen, Pontani, Lieberman & Pavane (57) ABSTRACT

A hydrodynamic clutch device, especially a hydrodynamic torque converter, includes a pump impeller installed in a housing, a turbine impeller having a turbine shell connected nonrotatably to a turbine hub, and possibly a stator. The turbine hub consists of several individually manufactured parts such as a sheet-metal parts, and the turbine shell is designed and mounted on the turbine hub so that it assumes some of the functions of the turbine hub, such as the sealing and guide functions.

23 Claims, 4 Drawing Sheets

HYDRODYNAMIC CLUTCH DEVICE

BACKGROUND OF THE INVENTION

1. Field of the Invention

The present invention pertains to a hydrodynamic clutch device having a pump impeller inside a housing and a turbine impeller including a turbine shell connected nonrotatably to a turbine hub. A clutch device of this type is known in the form of, for example, a hydrodynamic clutch or a hydrodynamic torque converter and can be used in the drive train of a motor vehicle.

2. Description of the Related Art

Hydrodynamic clutch devices usually have a pump impeller, mounted in a housing, and a turbine impeller with a turbine shell, to which a turbine hub is connected nonrotatably. If the hydrodynamic clutch device is a hydrodynamic torque converter, a stator is also provided.

Hydrodynamic torque converters convert and transmit the torque produced by a machine such as an internal combustion engine. The pump impeller, the turbine impeller, and the stator are usually designed as curved shell components, and each wheel has a number of vanes. The individual wheels of the hydrodynamic torque converter run in the closed housing, which is filled with a working fluid.

In the normal case, the pump impeller is driven by the flywheel of the internal combustion engine via the housing at the rpm's determined by the engine. During startup phase, only the pump impeller turns at first; the turbine impeller and, if present, the stator, are stationary. The working fluid flows from the pump impeller to the turbine impeller and transfers its energy to it. The turbine impeller is connected nonrotatably via the turbine hub to a shaft, which, in a motor vehicle, for example, is a take-off shaft or a transmission input shaft. As soon as the torque generated via the pump impeller on the turbine impeller is greater than the resistance torque of the shaft, the turbine impeller and thus also the shaft begin to turn.

In addition, hydrodynamic torque converters also usually have a bridging clutch, which is also installed inside the converter housing. Like a friction clutch, a bridging clutch of this type has the task of producing a slip-free connection, insofar as possible, between the converter housing and the shaft, such as the transmission input shaft. Individual components of the bridging clutch are usually also connected to the hub of the turbine.

Hydrodynamic torque converters of the general type described above are already known and are used especially in the automotive industry. An example is described in DE 198 38 445. In an exemplary embodiment presented in this document, a hydrodynamic torque converter is disclosed which has a pump impeller, a turbine impeller, and a stator inside a housing. The turbine impeller has a turbine shell and a connecting element, which are connected to each other. By way of the connecting element, the turbine shell is connected to one-part turbine hub, which is connected nonrotatably to the shaft.

In the case of a hydrodynamic clutch device, the turbine hub is called upon to perform several different functions. For example, it serves, first, as a connecting site for the turbine shell. If, in addition, a bridging clutch is provided, this clutch usually has a clutch piston, as will be described in further detail below. This clutch piston must be guided and driven. For this purpose, the piston has in the past been attached to and/or guided by the turbine hub. In addition, the stroke which the clutch piston can execute must be limited, and this has also been one of the functions of the turbine hub. Finally, the turbine hub also has the job of supporting various bearings such as axial bearings, roller bearings, plain bearings, etc.

When the hydrodynamic torque converter is equipped with a bridging clutch, this clutch usually includes a clutch piston. The radially outer area of this clutch piston, for example, can be provided with friction facings, which can, as a function of a pressure difference between the interior space of the converter and a chamber formed between the converter housing and the clutch piston, be pressed against an opposing friction surface of the converter housing. In its radially inner area, the clutch piston is usually sealed off against the turbine hub by the intermediate installation of a sealing element but still retains its freedom to rotate. The sealing element can be designed as a suitable sealing ring, which is held in a sealing groove made in the turbine hub. The turbine hub thus also has the function of making available an appropriate sealing ring groove.

Because of all these various functions which the turbine hub must fulfill, and because of the fact that heavy loads act on the turbine hub during the operation of the hydrodynamic torque converter, turbine hubs have been produced in the past as one-part components, which must be subjected to additional processing steps after their production. Thus, for example, it has been conventional in the past to produce turbine hubs as sintered metal parts or forgings, which are then machined in various ways. These metal-removing machining processes create appropriate contact surfaces and guide surfaces for the seating of the clutch piston, for the seating of sealing rings, for the connection of the turbine shell, etc., on the hub. In addition, the sealing ring groove described above must also be cut into the turbine hub, which can be done by means of, for example, a lathe-turning process.

These metal-removing machining processes in particular are very expensive and therefore disadvantageous. First, machining is time-consuming, because various work steps and processes are required to bring the turbine hub into it final desired shape after its rough shape has been produced. The production of a turbine hub is therefore also complicated structurally, because the sealing ring groove in particular must be produced in a highly precise manner. Finally, the metal-removing machining of parts suffers from the disadvantage that large amounts of waste material are generated, which must be stored separately and recycled. All in all, the production of turbine hubs as it has been done in the past is highly cost-intensive.

SUMMARY OF THE INVENTION

The object of the present invention is to improve a hydrodynamic clutch device of the general type cited above so that it can be produced easily in terms of construction and also at low cost.

According to the invention, a hydrodynamic clutch device, especially a hydrodynamic torque converter, is provided which has a pump impeller; a turbine impeller, which has a turbine shell and a turbine hub nonrotatably connected to it; and possibly a stator, all installed inside a housing. The turbine hub consists of several parts and the turbine shell is designed and mounted on the turbine hub so that it takes over some of the functions of the turbine hub.

As a result of the hydrodynamic clutch device according to the invention, it is possible to avoid the disadvantages of the state of the art described above. The hydrodynamic clutch device is not limited to specific design embodiments. For example, it is conceivable that the hydrodynamic clutch device could be designed either as a hydrodynamic clutch or as a hydrodynamic torque converter. To make it easier to understand the invention, it is described below on the basis of a hydrodynamic torque converter in particular, although the invention is not to be considered limited to this concrete embodiment.

The first basic idea of the invention is that the turbine hub is no longer designed as a single part but rather as a unit consisting of several parts. As a result, the individual components of the turbine hub can be easily produced first by suitable production methods. The individual parts of the turbine hub thus produced are then assembled to obtain the completed turbine hub. By providing the individual parts with the appropriate contouring and by assembling these parts appropriately to form the complete turbine hub, it is possible to eliminate the previously required metal-removing steps such as the production of the contact surfaces, the introduction of the sealing ring groove, etc.

At least some of these individual parts of the turbine hub can be made out of sheet metal.

Sheet-metal parts can be produced easily in terms of construction and thus at low cost, even when their contours are relatively complex. For example, the sheet-metal parts can be produced by methods such as rolling, upsetting, drawing, deep-drawing, pressing, and the like. The choice of a suitable process depends on the contour of the sheet-metal part to be made and on the selected material.

When the individual elements are designed in the form of sheet-metal parts, furthermore, it is possible to produce cavities in them, which leads to an advantageous reduction in the installation space and/or weight of the hydrodynamic clutch device. It is also possible to form grooves, such as oil feed grooves, snap connections, etc., in the sheet-metal parts. These structures can be produced much more easily in sheet metal than in the conventional solid turbine hubs and thus at lower cost.

By shaping the sheet-metal parts in appropriate ways, certain areas can also be produced which can function as "disk springs" in the area of the axial bearings. As a result, axial play and/or bearing lift-off can be reduced, possibly even to zero in the most favorable case.

Another basic idea of the present invention is designing the turbine shell of the turbine impeller and mounting it on the turbine hub in such a way that it takes over certain functions of the turbine hub. As a result, the construction work involved in making the turbine hub and thus also in producing the hydrodynamic clutch device overall can be reduced even further.

Some of the primary functions which the turbine hub unit must perform were mentioned in the introduction to the specification. Some of these functions can now be taken over by the turbine shell, which reduces the amount of construction work required to produce the turbine hub. Examples of this are explained in greater detail in the further course of the specification.

As a result of the design of the hydrodynamic clutch device according to the invention, a simple structural solution is therefore created, according to which the turbine shell is integrated into the functions of a multi-part turbine hub. The components of the turbine hub can be made very easily and with little machining. In particular, the various required surfaces and stops can be easily produced by suitable shaping processes, as a result of which little or no metal-cutting is required. In addition, different bearing functions can be easily integrated into the individual components of the turbine hub or into the turbine shell. As a result of the multi-part design of the turbine hub and the integration of the turbine shell into the functions of the turbine hub, the required area which the ring-shaped surface of the turbine hub must have can be reduced, which also leads to a reduction in the amount of space required for the installation of the overall hydrodynamic clutch device.

It is advantageous for the hydrodynamic clutch device to have a bridging clutch, which has a clutch piston. As has already been described above, a bridging clutch of this type is advantageous when the hydrodynamic clutch device is designed as a hydrodynamic torque converter. The invention is not limited to specific types of bridging clutches. Thus, for example, it is conceivable that the bridging clutch could be designed in such a way that the clutch piston carries a friction facing and that this facing comes into direct contact with the adjacent converter housing. It is also conceivable, however, that the bridging clutch could be designed so that a disk is located axially between the cover of the converter housing facing the engine and a clutch piston, this disk being provided to accept friction facings and connected nonrotatably to the turbine impeller.

To be able to compensate for the vibrations which occur during the operation of the hydrodynamic clutch device, it is also possible to provide a torsional vibration damper.

It is advantageous for at least certain areas of the turbine shell to be designed as a guide element for the clutch piston.

It is conceivable, for example, that the turbine shell could form a radial guide surface for the clutch piston and that the clutch piston could be guided and/or supported in its radially inward area against a radially inner area of the turbine shell.

"Radially inner" and, later on in the specification, "radially outer" are to be understood as based on the rotational axis of the hydrodynamic clutch device.

The clutch piston does not necessarily have to be permanently connected to the turbine shell. For example, it is conceivable that the clutch piston could be supported only against the radial guide surface formed by the turbine shell. This facilitates assembly.

It is advantageous for the turbine shell to be shaped in such a way that it has an axial limiting surface for a sealing ring groove. In the past, the turbine hub has been the sole component responsible for providing the sealing ring groove; that is, the sealing ring groove had to be machined into the turbine hub on a lathe. Now, a part of the turbine shell can be integrated into this function of the turbine hub, that is, the function of providing the sealing ring groove, in that a certain part of the turbine shell represents an axial boundary surface for the sealing ring groove. In this way, the sealing ring groove is formed when the individual parts of the turbine hub are assembled with the turbine shell. This eliminates the need to remove metal from the turbine hub in a machining process.

For example, it is conceivable for the turbine shell to be mounted a defined distance away from the individual components of the turbine hub which form the other boundary surfaces of the sealing ring groove and for the complete sealing ring groove to be created only after assembly, where each individual component represents in and of itself only a part of the complete sealing ring groove.

It is advantageous for the axial boundary surface formed by the turbine shell for the sealing ring groove to be formed by a radially inner end of the turbine shell. In this way, no special constructive measures are required to form the sealing ring groove.

In a further elaboration, the turbine shell can have a radially inner contact surface for the insertion of an additional component. Through the appropriate design of the individual components of the turbine hub and of the turbine shell, receiving spaces can be formed upon assembly of the parts, into which the other components can be inserted. For example, these additional components can be pressed into the space thus formed. This facilitates the assembly of the hydrodynamic clutch device.

It is advantageous for the torsional vibration damper to be connected to the turbine shell and/or to the turbine hub and/or to the clutch piston.

As already mentioned, as a result of the hydrodynamic clutch device according to the invention with the multi-part design of the turbine hub and the integration of turbine hub functions to the turbine shell, it is possible for a receiving space serving as a sealing ring groove for the acceptance of the sealing ring to be formed between the turbine hub and the turbine shell.

In addition, the turbine hub, or one or more individual components of the turbine hub, can be designed as radial and/or axial boundaries of the sealing ring groove. An additional axial boundary for the sealing ring groove can be provided by the turbine shell. In this way, the cutting of a sealing ring groove, such as by a suitable turning process, becomes superfluous. Individual areas of the individual elements of the turbine hub or turbine shell, such as edges and/or surface areas, possibly flattened surface areas, serve as components of the sealing ring groove. After assembly of the individual components, these individual areas work together to form in their totality the sealing ring groove, into which then a corresponding sealing ring can be inserted so as to produce, for example, the seal described above with respect to the bridging clutch. The individual parts of the sealing ring groove in the various components can be produced easily.

It is advantageous for the turbine hub to have a core element for the sake of its attachment to a shaft, for example. In the simplest case, this core element can be designed as a sleeve and be connected nonrotatably to the shaft. A connection of this kind can be established by means of, for example, a set of drive teeth. The core element can have an internal set of teeth, which is brought into engagement with a set of external teeth on the shaft, such as a transmission input shaft.

It is also advantageous for the core element to be designed as a connection site for the turbine shell. In this case, it is advantageous for the core element to have, next to the area where it connects with the shaft (the first core element area), a radially outward-extending second area (the second core element area), which guides a radially inner area of the turbine shell, which can be fastened to this second area if necessary. The turbine shell can be attached to the core element in various ways. For example, it can be riveted, screwed, etc., to the core element. It is also conceivable, however, that the connection could be realized by means of a suitable welding process or the like.

It is advantageous for the core element to be designed to provide a radial and/or axial boundary of the sealing ring groove. Another boundary surface, as described further above, is provided by the turbine shell itself.

The core element can, for example, be designed to consist of two parts, namely, a first and a second core element part, where the first core element part has an attachment device (e.g., a set of teeth) for attachment of the turbine hub to the shaft. The second core element part is then connected in some suitable manner, such as by welds or an adhesive or the like, to the first core element part, so that it can extend outward in the radial direction.

It is then advantageous for the second core element part to be designed as a connection site for the turbine shell.

It is advantageous to provide the radially outer area of the (one-part) core element or the radially outer area of the second core element part (of a multi-part core element) with drive teeth to engage with a set of drive teeth on the torsional vibration damper and/or on the clutch piston.

It is preferable for the turbine shell to have an opening through which the set of drive teeth can pass.

As a result of the design described above, it is possible, first, to realize an extremely compact design variant, in which the individual components of the turbine hub and the turbine shell are guided in optimum fashion alongside each other and supported against each other. In addition, it is also possible for the turbine shell to take over certain functions of the turbine hub, such as the sealing ring groove function. The teeth provided in the outer area of the second core element part can pass through the opening in the turbine shell and project into the drive teeth of a torsional vibration damper. Of course, the teeth can also engage in a set of drive teeth connected directly to the clutch piston.

It is advantageous for the turbine hub to have an intermediate element for support against the housing. Regardless of whether the core element consists of a single part or multiple parts, this intermediate element represents an additional component of the turbine hub. For this reason, it is advantageous for the intermediate element to be connected to the core element of the turbine hub. For this purpose, it is advantageous for the intermediate element to be fixed permanently to the core element by a suitable welding process, adhesive bonding process, etc. Depending on the design of the individual elements of the turbine hub and of the turbine shell, however, it is also conceivable that the intermediate part could fixed in place by means of a pressing process or the like.

The intermediate element can be designed as a radial and/or axial boundary of the sealing ring groove. In this case, an axial boundary can again be provided by the turbine shell.

It is advantageous for the (one-part) core element and/or the second core element (of a multi-part core element) or the intermediate element to be designed as a connecting site for the torsional vibration damper.

It is preferable for the turbine hub to have at least one contact surface for at least one axial bearing and/or at least one roller bearing. The contact surfaces can in this case be provided on the core element and/or on the intermediate element of the turbine hub.

As a result of the contact surface(s) provided, the turbine hub or the individual components of the turbine hub can take over the job of providing radial and axial guidance for bearings such as axial bearings, roller bearings, etc. The turbine hub can in this way also perform the function of a plain bearing.

The turbine hub can also have a contact surface for the insertion of a rotary shaft seal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

FIGS. 1–4 show a hydrodynamic clutch device 10, which is designed as a hydrodynamic torque converter for a motor vehicle. The basic designs are the same in each case, so that the basic design applicable to all four figures is described first. The individual embodiments according to FIGS. 1–4 differ in the design of the turbine hub and in the way in which the individual components of the hydrodynamic torque converter are connected to the turbine hub.

The hydrodynamic torque converter 10 has a converter housing 11 with a housing cover 18 and a pump impeller shell 19 of a pump impeller 12. This pump impeller shell 19 is connected nonrotatably at the radially inner end to a pump impeller hub 17 and carries a number of pump impeller vanes (not shown explicitly). Axially between the housing cover 18 and the pump impeller 12 is a turbine impeller 13 with a turbine shell 40, which is connected nonrotatably at its radially inner end to a turbine hub 60, and which carries a number of turbine vanes (not shown explicitly). Axially between the turbine impeller 13 and the pump impeller wheel 12 is a stator 14 with a number of stator vanes 15 mounted on it; in the exemplary embodiments, only a single stator vane 14 is shown for the sake of clarity. The stator 14 is supported with freedom of rotation by way of a freewheel device on a stator support shaft (not shown explicitly). The stator support shaft can be connected permanently to a transmission, for example, and be nonrotating. It can serve to absorb the stator torque. When the stator 14 rotates with its stator vanes 15 around the rotational axis D, this is done exclusively by way of the freewheel device, which serves in this case as a "bearing".

The hydrodynamic torque converter 10 also has a bridging clutch 20 which, in the exemplary embodiments shown, comprises a clutch piston 22. By way of the intermediate arrangement of friction facings 21, the radially outer area of this clutch piston 22 can be pressed against an opposing friction surface of the housing cover 18 as a function of the pressure difference between the interior space 25 of the converter and a chamber 26 formed between the housing cover 18 and the clutch piston 22.

To compensate for the vibrations which develop, a torsional vibration damper 30 is provided, which is connected to the clutch piston 22 of the bridging clutch 20 by means of, for example, an appropriate riveted joint. According to FIGS. 1–3, the torsional vibration damper 30 is also connected to the turbine shell 40. In the exemplary embodiment according to FIG. 4, the torsional vibration damper 30 is connected to the turbine hub 60. A torque-transmitting connection between the clutch piston 22 and the turbine shell 40 and the turbine hub 60 is provided by way of the torsional vibration damper 30, so that, when the bridging clutch 20 is engaged, torque is transmitted directly (thus bypassing the converter circuit) from the housing cover 18 via the clutch piston 22 and the torsional vibration damper 30 to the turbine impeller 13 and a shaft connected to it (not shown explicitly here), which can be, for example, a transmission input shaft.

The turbine hub 60 is no longer produced as a single part by the unavoidable use of appropriate metal-removing machining steps. Instead, the turbine hub 60 is now designed as consisting of multiple parts, where at least some of the individual parts of the turbine hub 60 can be made of out sheet metal. In this way, the individual parts can be produced very easily and thus inexpensively, even if each individual part has a relatively complex shape. The production of the individual sheet-metal parts can be done, for example, by means of suitable forming processes such as drawing, rolling, pressing, etc.; the choice of the forming process suitable in a particular case will depend on the material and on the contour of the sheet-metal part to be realized. It is now also provided in accordance with the invention that the turbine shell 40 of the turbine impeller 13 is designed in such a way and mounted on the turbine hub 60 in such a way that the turbine shell 40 takes over certain functions of the turbine hub 60.

Various functions which the turbine hub 60 must fulfill in the converter 10 have already been explained in the introduction to the specification, so that reference can merely be made here to that previous discussion.

In the following, several nonexclusive exemplary embodiments are described as representatives of how the design of the converter 10 can be realized in accordance with the invention.

Figure 1:
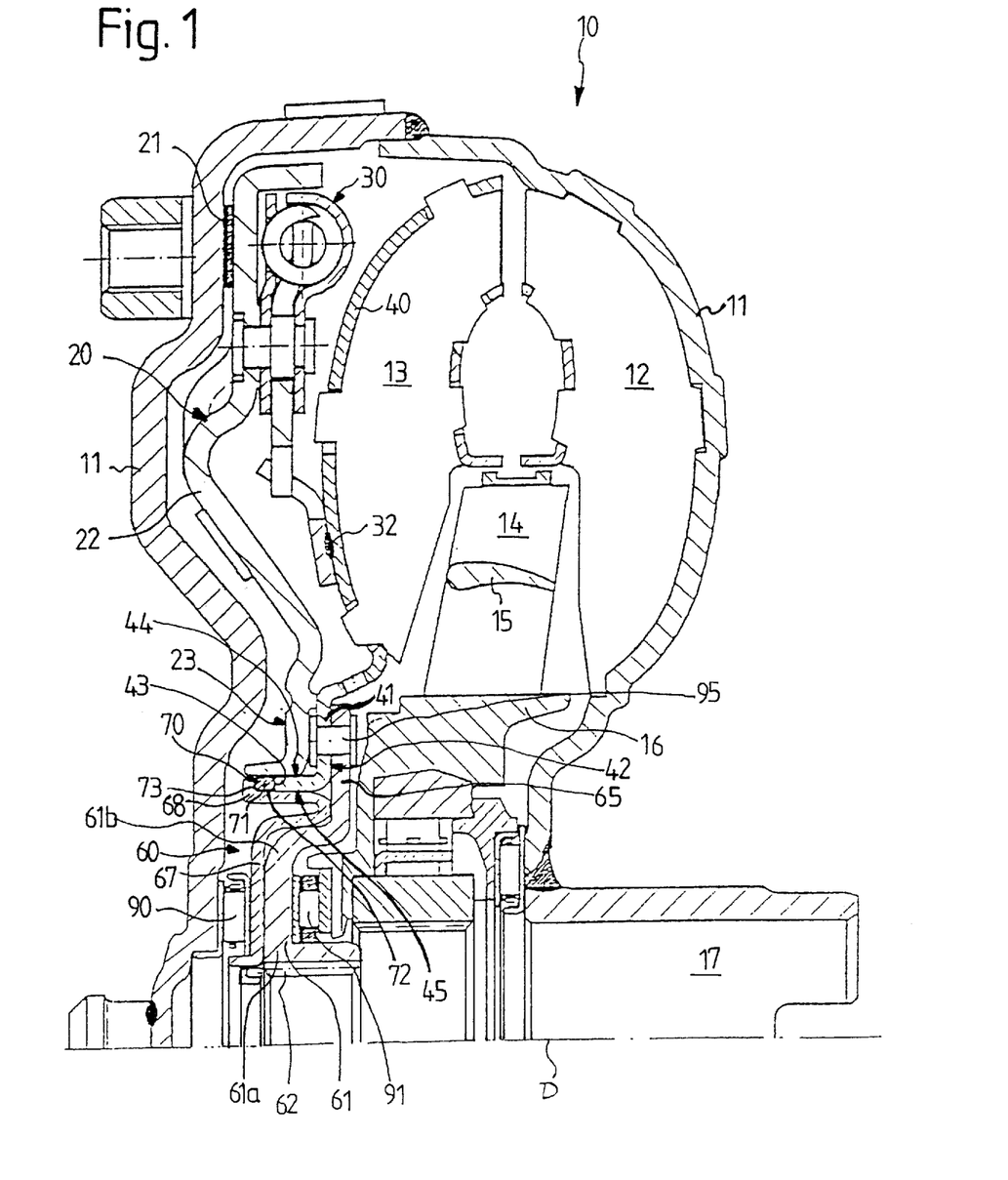
FIG. 1 shows a cross-sectional quadrant view of a converter according to a first embodiment of the present invention.

FIG. 1 shows an exemplary embodiment of a converter 10 in which the turbine hub 60 includes a first part formed by a core element 61, and a second part formed by an intermediate element 67.

The core element 61 is designed as a single part having drive teeth 62 by means of which the turbine hub 60 can be attached to a shaft (not shown). The internal teeth provided on the core element 61 engage in a set of external teeth on the shaft. Thus the core element 61 is attached nonrotatably to the shaft. Next to the first core element area 61a with the teeth 62, the core element 61 has a second core element area 61b, which extends radially outward from the first core element area 61a. An extension "radially outward" or, as will be mentioned further on in the specification, an extension "radially inward" is always in reference to the rotational axis D of the converter 10.

The second core element area 61b has a radially outer area 65, which forms a contact surface for the turbine shell 40. The radially inner area 42 of the turbine shell 40 is connected in this case by rivets 95 to the core element 61. Other types of connections such as welds, etc., are also conceivable.

The core element 61 also has a centering surface for an axial bearing 91.

In the exemplary embodiment according to FIG. 1, the turbine shell 40 is integrated into the function of the turbine hub 60 so that it forms a radial contact surface 41 for the clutch piston 22. For this purpose, the radially inner area 23 of the clutch piston 22 is extended to or supported on the radially inner area 42 of the turbine shell 40. In the simplest case, the clutch piston 22 can merely rest on the area 42 of the turbine shell 40.

In addition, the radially inner end 44 of the turbine shell 40 forms an axial boundary surface 43 for a sealing ring groove 70. The sealing ring groove 70 serves to accept a sealing ring 71, by means of which the clutch piston 22 is sealed off against the turbine hub 60 of the turbine impeller 13, but is still supported there with the freedom to rotate.

Another axial boundary 73 and a radial boundary 72 for the sealing ring groove 70 are realized in the exemplary embodiment according to FIG. 1 by the intermediate element 67 of the turbine hub 60. This intermediate element 67, which is also designed as a sheet-metal part, serves, first, to support the turbine hub 60 against the housing 11. For this purpose, the intermediate element 67 can have, for example, a receiving surface for a roller bearing 90, or it can be shaped appropriately to serve directly as a plain bearing.

The sealing ring groove 70 does not, therefore, have to be cut directly into the turbine hub 60 on a lathe. Instead, the sealing ring groove 70 is formed automatically when the core element 61, the intermediate element 67, and the turbine shell 40 are assembled. This has the effect of bringing about a significant reduction in the amount of fabrication work required.

The intermediate element 67 can be connected to the core element 61 by means of a snap connection, for example. In the case of the exemplary embodiment shown in FIG. 1, the core element 61 has a curved configuration in its radially outer area 65, which works together with the radially inner end 44 of the turbine shell 40, which extends at an angle from the radial guide surface 41 for the clutch piston 22, to form a receiving space, into which an appropriately resilient end region of the intermediate element 67 can be pressed. As a result of the resilient forces in play, the terminal region 68 of the intermediate element 67 is pressed against the radially inner contact surface 45, formed by the radially inner end 44 of the turbine shell 40, and also against the core element 61. This guarantees a secure and permanent seating.

Figure 2:
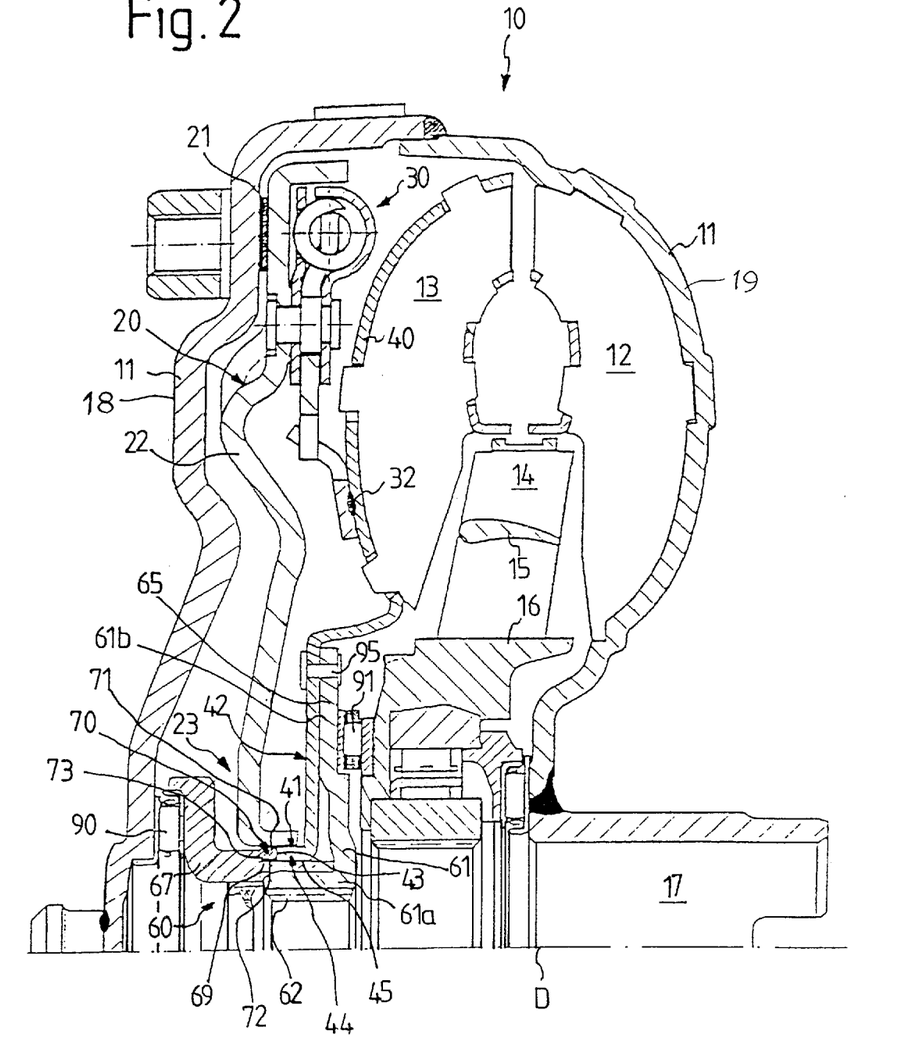
FIG. 2 shows a cross-sectional quadrant view of a converter according to a second embodiment of the present invention.

FIG. 2 shows another embodiment of a converter 10, in which the turbine hub 60 is designed in a different way. Again, the turbine hub 60 consists of a core element 61 with a first core element area 61a and a second core element area 61b. The core element 61 is again connected nonrotatably to a shaft (not shown) by a set of teeth 62 provided in the first core element area 61a. The core element 61 has in its core element area 61b a contact surface for an axial bearing 91. The radially outer area 65 of the core element 61 forms a contact surface for the radially inner area 42 of the turbine shell 40. The radially inner end 44 of this radially inner area 42 of the turbine shell 40 also forms inner area 23 of the clutch piston 22 can be in contact with the turbine shell 40 in the manner described in FIG. 1.

The radially inner area 42 of the turbine shell 40 is connected to the radially outer area 65 of the core element 61 of the turbine hub 60 by means of an appropriate riveted connection 95 in the present case or, as mentioned, by means of welds or the like.

Again, the turbine shell 40 performs not only the turbine hub function of guiding the clutch piston 22 but also the function of forming a sealing ring groove 70 to accept a sealing ring 71. For this purpose, the radially inner end 44 of the turbine shell 40 forms an axial boundary surface 43 for the sealing ring groove 70.

Another axial boundary 73 and a radial boundary 72 of the sealing ring groove 70 is realized by an intermediate element 67 of the turbine hub 60. This intermediate element serves, among other things, to support the turbine hub 60 against the housing 11 and has for this purpose a receiving surface for a roller bearing 90. It would also be possible for a plain bearing to be integrated directly here into the intermediate element 67. In addition, the intermediate element 67 has a step-like shoulder 69, the edges of which form the radial boundary 72 and the axial boundary 73 of the sealing ring groove 70. The sealing ring groove 70 is thus formed by the turbine shell 40 and the intermediate element 67. It does not have to be machined into the turbine hub 60 as in the past; instead, it is formed automatically when the individual components are assembled.

Again, the intermediate element 67 can be connected easily to the core element 61. When the turbine shell 40 is connected by its radially inner area 42 to the radially outer area 65 of the core element 61 of the turbine hub 60, by means of, for example, a riveted joint 95, a receiving space, into which the step-like shoulder 69 of the intermediate element 67 can be pressed, is formed by the first core element area 61a and a radially inner contact surface 45 of the radially inner end 44 of the turbine shell 40. This alone is sufficient to produce a permanent and secure connection between the individual parts. It is also conceivable, of course, that the intermediate element 67 could be additionally or exclusively connected by way of a different type of connection, such as by means of welds, and adhesive bonds, or the like, to the core element 61.

The individual parts of the turbine hub 60, namely, the core element 61 and the intermediate element 67, can also be produced easily in terms of fabrication work in the case of the embodiment shown in FIG. 2. As a result of the assembly of the individual components of the turbine hub 60 and the attachment of the turbine shell 40 to the turbine hub 60, individual functions of the turbine hub 60, including in the present case the guidance of the clutch piston 22 and the formation of a sealing ring groove 70 can be integrated into the turbine shell 40, which offers the advantages discussed above.

Figure 3:
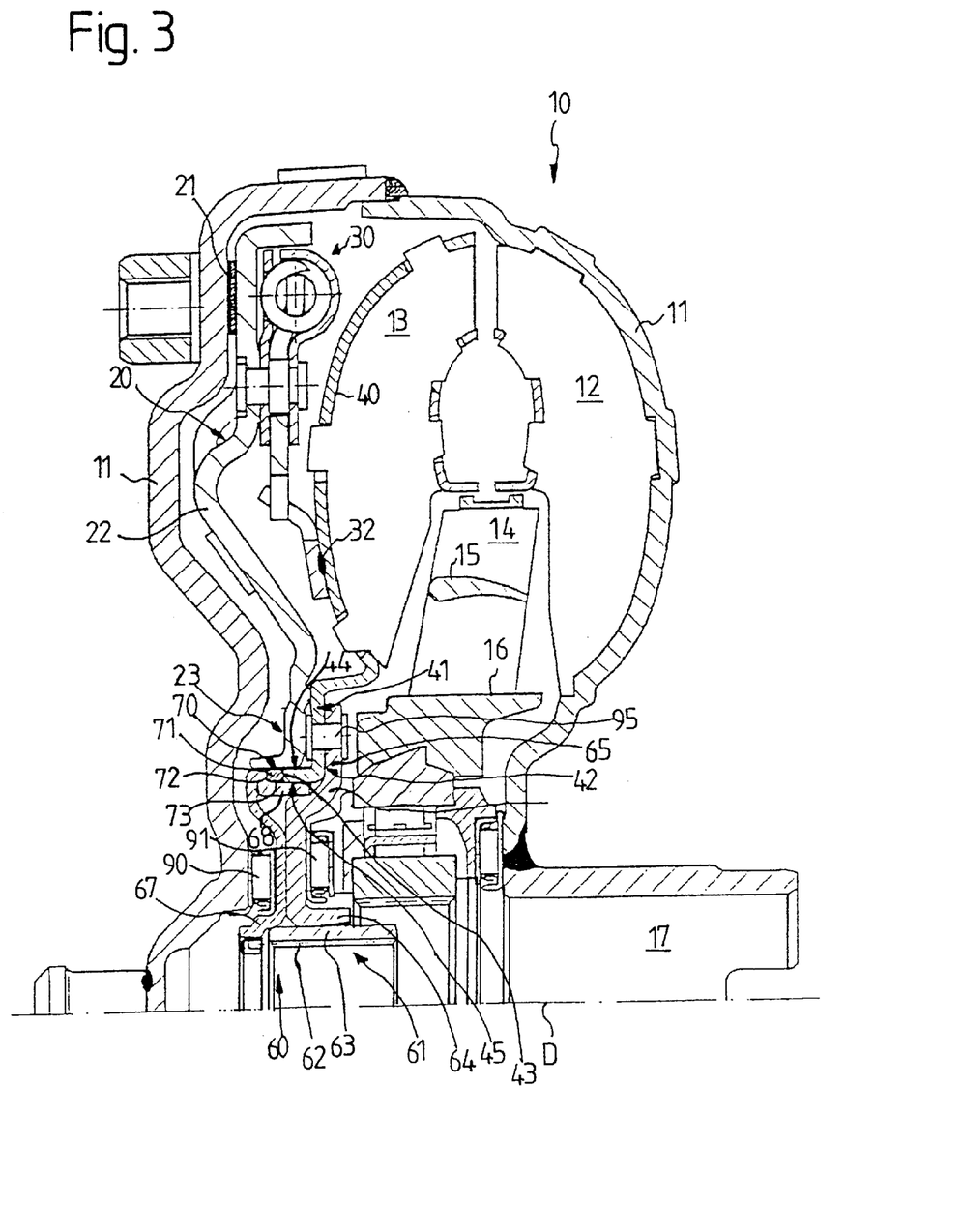
FIG. 3 shows a cross-sectional quadrant view of a converter according to a third embodiment of the present invention.

In the case of the converter 10 shown in FIG. 3, the turbine hub 60 consists of 3 parts overall, namely, a multi-part core element 61, which is formed by a first core element part 63 and a second core element part 64, and an intermediate element 67.

The first core element part 63 is designed as a simple, ring-shaped sleeve, which is connected nonrotatably to a shaft (not shown) by an appropriate set of teeth 62. The second core element part 64 is fixed in place on this first core element part 63 by, for example, suitable welds, adhesive bonds, or the like. The design of the second core element part 64 is approximately the same as that of the second core element area 61b of the core element 61 according to FIG. 1.

In comparison with FIG. 1, the core element 61 according to FIG. 3 can be produced even more easily, in that, first, the sleeve-shaped first core element part 63 and the second core element part 64 are produced independently of each other, such as by means of a suitable shaping process such as rolling, drawing, pressing, etc. Then these two individual parts are connected to each other, so that the core element 61 with the more complicated contour is obtained.

In the radially outer area 65 of the second core element part 64, this part is connected to a radially inner area 42 of the turbine shell 40; in the present case, this is done with rivets 95. The radially inner area 42 of the turbine shell 40 serves simultaneously as a guide surface 41 for the clutch piston 22, so that the turbine shell takes over this function of the turbine hub 60. For this purpose, the radially inner area 23 of the clutch piston 22, in a manner similar to that of the exemplary embodiments according to FIGS. 1 and 2, is supported against the radially inner end 44 of the turbine shell 40 or possibly additionally attached thereto. The radially inner end 44 of the turbine shell 40 again forms an axial boundary surface 43 for the sealing ring groove 70. Thus the function of providing a sealing ring groove 70 is also taken over at least partially by the turbine shell 40.

The additional axial boundary 73 and the radial boundary 72 of the sealing ring groove 70 is realized by the intermediate element 67 of the turbine hub 60, so that a sealing ring 71 can ultimately be inserted into it. The intermediate element 67 also serves to support the turbine hub 60 against the housing 11 and has for this purpose a contact surface for the acceptance of a roller bearing 90. It would also be possible here for a plain bearing to be formed directly on the part. In addition, the second core element part 64 also has a contact surface for an axial bearing 90.

The production of the turbine hub 60, that is the fixation of the turbine shell 40 to the turbine hub 60, is again accomplished by, first, connecting the radially inner area 42 of the turbine shell 40 by rivets 95 or by welds, etc., to the radially outer area 65 of the second core element part 64. This second core element part 64 has been previously connected to the first core element part 63.

In the case of the exemplary embodiment shown in FIG. 3, the radially inner end 44 of the turbine shell 40 again projects axially away from the radially inner area 42, so that a radially inner contact surface 45 is formed for an additional component, in the present case the intermediate element 67. As a result of this radially inner contact surface 45 on the turbine shell 40 and the curved contour of the second core element part 64, a receiving space is defined, into which a terminal area 68 of the intermediate element 67 can be pressed. In addition, a further means of fixation such as welding, bonding, etc., can also be provided.

Figure 4:
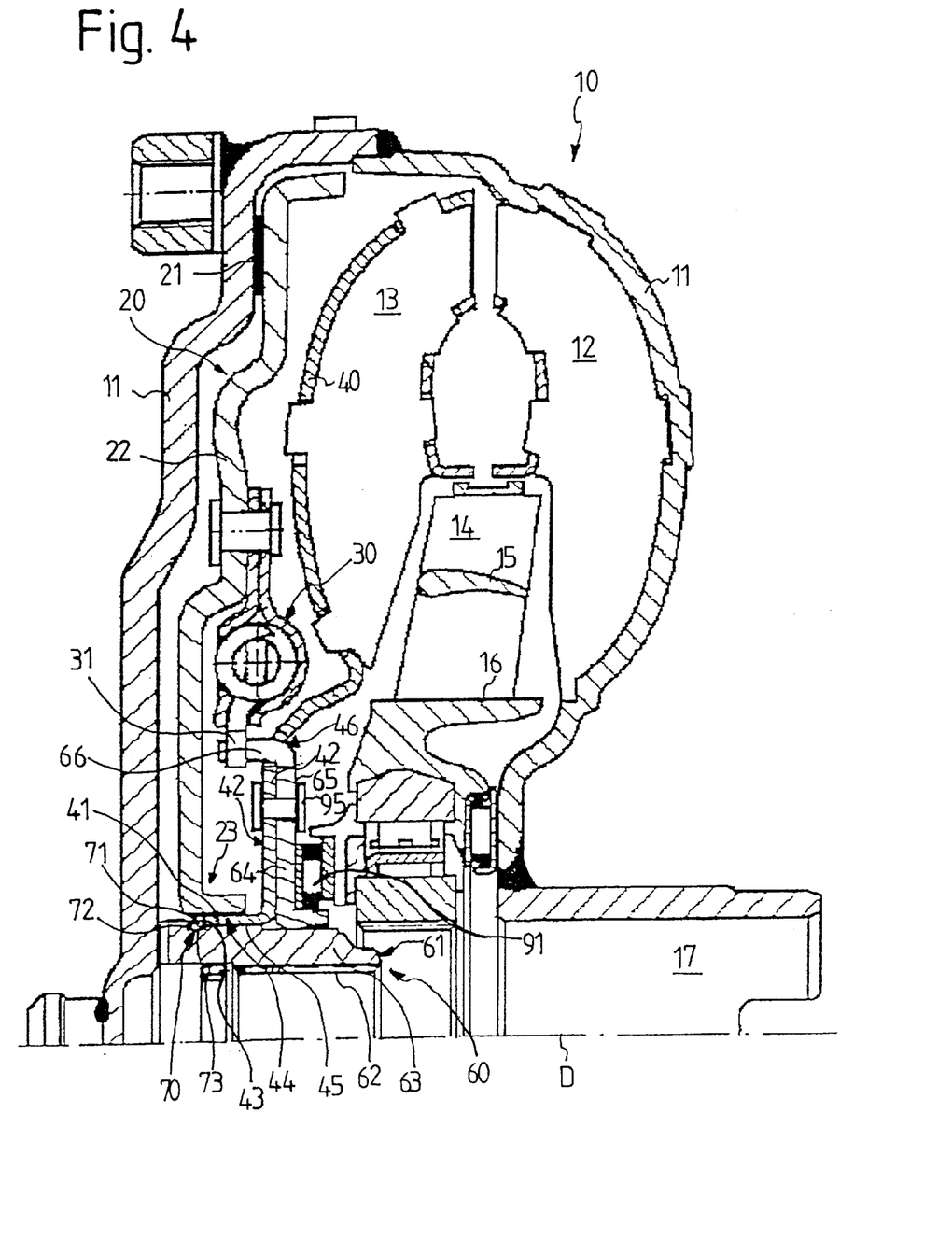
FIG. 4 shows a cross-sectional quadrant view of a converter according to a fourth embodiment of the present invention.

In the case of the exemplary embodiment shown in FIG. 4, the turbine hub 60 has a multi-part core element 61, which is formed by a first core element part 63 and a second core element part 64. In contrast to the embodiments previously described, no intermediate element 67 is provided, which means that the turbine hub 60 is supported against the housing 11 by the first core element part 63, which also has the teeth 62 for a nonrotatable connection to a shaft (not shown).

On the first core element part 63, the second core element part 64, which extends radially outward, is attached by means of, for example, suitable welds, adhesive bonds, etc. The second core element part 64 has a contact surface for an axial bearing 91. But a plain bearing surface could also be provided directly on it.

To produce a sealing ring groove 70, the first core element part 63 has a step-like shoulder, which forms both an axial boundary 73 and a radial boundary 72 for the sealing ring groove 70. The other axial boundary surface 43 for the sealing ring groove 70 is again formed by the radially inner end 44 of a radially inner area 42 of the turbine shell 40. An appropriate sealing ring 71 can be inserted into the sealing ring groove 70 thus created, which again is formed without any metal-removing steps, that is, simply by the assembly of the individual components.

The turbine shell 40 again takes over at least some of the function of providing a sealing ring groove 70, which in the past had to be fulfilled completely by the turbine hub 60.

At the same time, the turbine shell 40 takes over the function of guiding the clutch piston 22 of the bridging clutch 20. For this purpose, the clutch piston 22 is guided or supported by its radially inner area 23 on a radially inner area 42 of the turbine shell 40, or in the area of the radially inner end 44 of the turbine shell 40.

The radially inner area 42 of the turbine shell 40 is connected to a radially outer area 65 of the second core element part 64 by means of, for example, a In the radially outer area 65 of the second core element part 64, there is also a set of drive teeth 66, which passes through an appropriate opening 46 in the radially inner area 42 of the turbine shell 40 and projects into a set of drive teeth 31 of the torsional vibration damper 30. In this way, the torsional vibration damper is not, as shown in FIGS. 1–3, connected directly to the turbine shell 40 but rather by way of the second core element part 64 to the turbine hub 60.

As an alternative, the drive teeth 66 could also engage in drive teeth connected directly to the clutch piston 22.

All of the exemplary embodiments described above have the common feature that the turbine hub 60 is designed to consist of several parts, and that the individual functions of the turbine hub 60 are now integrated into the turbine shell 40. For this purpose, the turbine shell 40 is designed and connected in a special way to the turbine hub 60. The individual components of the turbine hub can be easily produced first, independently of each other, and then assembled to form the complete component. As a result, it is possible for the individual components to be produced as close to their final dimensions as possible, so that the need for metal-removing machining, such as that which used to be required in the known solutions according to the state of the art, can be eliminated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A hydrodynamic clutch device comprising
    a housing;
    a pump impeller in said housing; and
    a turbine impeller having a turbine shell connected nonrotatably to a turbine hub, said turbine hub comprising a plurality of individually manufactured hub elements which are fixed together, wherein said turbine hub and said turbine shell at least partially define a sealing ring groove for receiving a sealing ring.

2. A hydrodynamic clutch device as in claim 1 further comprising a bridging clutch having clutch piston which provides a releasable connection between said turbine shell and said housing.

3. A hydrodynamic clutch device as in claim 2 further comprising a torsional vibration damper connected between said clutch piston and said turbine shell.

4. A hydrodynamic clutch device as in claim 3 wherein said torsional vibration damper is fixed to said clutch piston and fixed against rotation relative to said turbine shell.

5. A hydrodynamic clutch device as in claim 3 wherein said core element comprises a first part and a second part which are individually manufactured, wherein said first part can be fixed against rotation to a shaft, and wherein said second part comprises a set of drive teeth which engage with drive teeth of said torsional vibration damper.

6. A hydrodynamic clutch device as in claim 5 wherein said turbine shell comprises at least one aperture for receiving said drive teeth on said second part therethrough.

7. A hydrodynamic clutch device as in claim 3 wherein said hub comprises a core element and an intermediate element, wherein said core element comprises a first part and a second part which are individually manufactured, wherein said first part can be fixed against rotation to a shaft, and wherein at least one of said first part, said second part, and said intermediate element is connected to said torsional vibration damper.

8. A hydrodynamic clutch device as in claim 2 wherein said turbine shell comprises portions which serve as a guide for movement of said piston relative to said turbine shell.

9. A hydrodynamic clutch device as in claim 8 wherein one of said portions of said turbine shell is a radial guide surface and another one of said portions of said turbine shell is a radially inner area which supports a radially inner area of said clutch piston.

10. A hydrodynamic clutch device as in claim 2 further comprising a sealing ring groove for accommodating a sealing ring between said clutch piston and said turbine hub, said turbine shell forming an axial boundary surface of said sealing ring groove.

11. A hydrodynamic clutch device as in claim 10 wherein said turbine shell comprises a radially inner end which forms said axial boundary surface of said sealing ring groove.

12. A hydrodynamic clutch device as in claim 1 wherein said turbine shell comprises a radially inner contact surface which receives said turbine hub thereagainst.

13. A hydrodynamic clutch device as in claim 1 wherein one of said hub elements forms a boundary of the sealing ring groove.

14. A hydrodynamic clutch device as in claim 1 wherein one of said hub elements is a core element which can be fixed against rotation to a shaft.

15. A hydrodynamic clutch device as in claim 14 wherein said core element is fixed to said turbine shell.

16. A hydrodynamic clutch device as in claim 14 wherein said core element forms a boundary of a sealing ring groove for accommodating a sealing ring.

17. A hydrodynamic clutch device as in claim 14 wherein said core element comprises a first part and a second part which are individually manufactured, and wherein said first part can be fixed against rotation to a shaft.

18. A hydrodynamic clutch device as in claim 17 said second part is fixed to said turbine shell.

19. A hydrodynamic clutch device as in claim 17 wherein said hub further comprises an intermediate element which is fixed to one of said first and second parts, and which supports said hub axially against said housing.

20. A hydrodynamic clutch device as in claim 19 wherein said intermediate element forms a boundary of a sealing ring groove.

21. A hydrodynamic clutch device as in claim 1 wherein one of said hub elements is an intermediate element which supports said hub axially against said housing.

22. A hydrodynamic clutch device as in claim 1 wherein said turbine hub comprises at least one contact surface for at least one of an axial bearing and a roller bearing.

23. A hydrodynamic clutch device as in claim 1 wherein said turbine hub comprises a surface for receiving a rotary shaft seal.

* * * * *